United States Patent
Jajodia et al.

(10) Patent No.: US 8,825,499 B2
(45) Date of Patent: Sep. 2, 2014

(54) SYSTEM AND METHOD FOR PROVISIONING SOCIAL NETWORKING SERVICES THROUGH RING BACK TONES

(75) Inventors: Anchal Ramgopal Jajodia, Bangalore (IN); Vinay Nanjundaiah, Bangalore (IN); Harish Babu, Bangalore (IN); Abhinav Anand, Darbhanga (IN); Rohith Koranapalli Nagaraju, Bangalore (IN); Gautam Agrawal, Bhagalpur (IN); Gorev Khanna, Lucknow (IN); Vinayasimha Patil, Bangalore (IN); Uttam Tholpadi S., Bangalore (IN)

(73) Assignee: OnMobile Global Limited, Bangalore (IN)

( * ) Notice: Subject to any disclaimer, the term of this patent is extended or adjusted under 35 U.S.C. 154(b) by 0 days.

(21) Appl. No.: 13/148,366

(22) PCT Filed: Feb. 5, 2010

(86) PCT No.: PCT/IN2010/000072
§ 371 (c)(1),
(2), (4) Date: Aug. 8, 2011

(87) PCT Pub. No.: WO2010/103532
PCT Pub. Date: Sep. 16, 2010

(65) Prior Publication Data
US 2011/0312305 A1    Dec. 22, 2011

(30) Foreign Application Priority Data

Feb. 6, 2009  (IN) .............................. 265/CHE/2009

(51) Int. Cl.
G06Q 30/02    (2012.01)
G06Q 10/10    (2012.01)
G06Q 10/06    (2012.01)
G06Q 40/02    (2012.01)
G06Q 99/00    (2006.01)
G06Q 50/00    (2012.01)

(52) U.S. Cl.
CPC ...................................... G06Q 50/01 (2013.01)
USPC .......................................... 705/1.1; 705/319

(58) Field of Classification Search
USPC .................................................... 705/1.1–912
See application file for complete search history.

(56) References Cited

U.S. PATENT DOCUMENTS

2008/0167015 A1    7/2008   Vishwanathan et al.

FOREIGN PATENT DOCUMENTS

EP        1 672 894 A1    6/2006
WO    2007/083926 A1    7/2007

*Primary Examiner* — Jonathan Ouellette
(74) *Attorney, Agent, or Firm* — Hoffmann & Baron, LLP

(57) ABSTRACT

A method and system for provisioning of social networking services through ring back tones is provided. In various embodiments of the present invention, when a caller makes a call to a callee, a ring back tone containing social network profile information is provided to the caller.

19 Claims, 4 Drawing Sheets

SYSTEM AND METHOD FOR PROVISIONING SOCIAL NETWORKING SERVICES THROUGH RING BACK TONES

FIELD OF INVENTION

The present invention relates to the field of Ring Back Tone (RBT) services and social networking websites. More particularly, the present invention enables provisioning of social networking services through ring back tones.

BACKGROUND OF THE INVENTION

In recent times, number of mobile users demanding value added services has been continuously increasing. Value added services include all services beyond standard voice calls and fax transmissions which are provided to the subscriber by a service provider. Examples of a value added service may include, but is not limited to, a Short Message Service (SMS), a Multimedia Messaging Service (MMS), a General Packet Radio Service (GPRS), an SMS alert, e-commerce services etc. Telecommunication service providers collaborate with value added service (VAS) providers to provide value added services to subscribers of a telecommunication service.

In a telecommunication network, when a caller makes a call to a callee using a communication terminal, the caller hears a call progress tone. Examples of the communication terminal may include without limitation, a mobile phone and a landline phone. The call progress tone is heard by the caller till the callee responds to the call and initiates a conversation with the caller. The call progress tone may include a ring back tone (RBT), a call busy tone and a call-waiting tone. Ring back tone (RBT) service is also an example of a value added service provided to the users. RBT is usually a monotonous sound heard by a caller while waiting for a callee to respond to a call. A ring back tone (RBT), which is conventionally a monotonous sound, can be replaced by other tones, for example, songs, personalized messages, advertisements, music, news, and sports commentary. Users have an option of selecting an RBT of their choice by subscribing to an RBT service. The RBT service enables the RBT subscriber to choose a particular tone as the RBT.

A significant number of mobile subscribers are also subscribers of social networking websites. Social networking web sites have gained popularity as they have become the new meeting grounds for many people. A social networking site is a website that facilitates building online communities of people who share interests or who are interested in exploring the interests and activities of others. The social networking websites enable users to connect with existing and old friends, find people sharing common hobbies and interests, establish new business contacts online and the like. Users maintain their profile in social networking sites which gives information about their location, interests, hobbies and the like. Users can share pictures and send messages through their profile to other users who can access this information by logging on to the social networking site. Additional services provided by a social networking site is providing updates on changes made by a user in the social network profile and recent activities of the user to other users. However, services like accessing social network profile information of users can be availed of only by a subscriber having access to the Internet. In an exemplary scenario, a mobile user may need access to a social networking service such as information about updates to a friend's profile but may not have access to the Internet. A value added service that may be attractive to such a mobile user may be access to a social network profile in an offline scenario.

In light of the above discussion, there exists a need to integrate social network services and mobile services such that innovative services may be provided to subscribers of such services.

SUMMARY OF THE INVENTION

A method and system for provisioning social networking services through ring back tones is provided. In various embodiments of the present invention, when a caller makes a call to a callee, a ring back tone containing social network profile information is provided to the caller.

In various embodiments of the present invention, the system for provisioning social. networking services through ring back tones includes a user interface configured to receive requests from a user regarding subscription to socio-RBT service application and further configured to receive subscription information from the user. The system further includes a social network API and an RBT social plug-in. The social network API is configured to retrieve user profile information from the online social network. The RBT social plug-in is configured to exchange socio-RBT service information communication between one or more elements of the social network and one or more elements of the telecommunication network.

In an embodiment of the present invention, the RBT social plug-in is further configured to generate an RBT media file based on the socio-RBT service applications subscribed by a user and to push the RBT media file to a database.

In an embodiment of the present invention, the system further comprises a tone player database, an RBT subscriber database and an RBT provisioning system. The tone player database is configured to store ring back tones to be played to a caller. The RBT subscriber database is configured to store socio-RBT service information and the RBT provisioning system is configured to upload subscription information of user in the RBT subscriber database and further configured to verify authenticity of the user.

In various embodiments of the present invention, the method for subscribing to a socio-RBT service for provisioning social networking services through ring back tones includes receiving a request from user for subscription to the socio-RBT service. After the request is received one or more predefined conditions are verified. The predefined conditions include RBT service subscription of the user, verification of eligibility of the user for subscription to the socio-RBT service application and authenticity of the user.

In various embodiments of the present invention, the method for provisioning online social network services to a user in a telecommunication network through ring back tones includes receiving a request for establishing a call between a caller and a callee. The method further includes retrieving ring back tone corresponding to social network profile stored in tone player database and playing the ring back tone to the caller. In an embodiment of the present invention, the method further includes receiving input from the caller for applying one or more applications of a socio-RBT service and then updating social network profile based on caller inputs.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
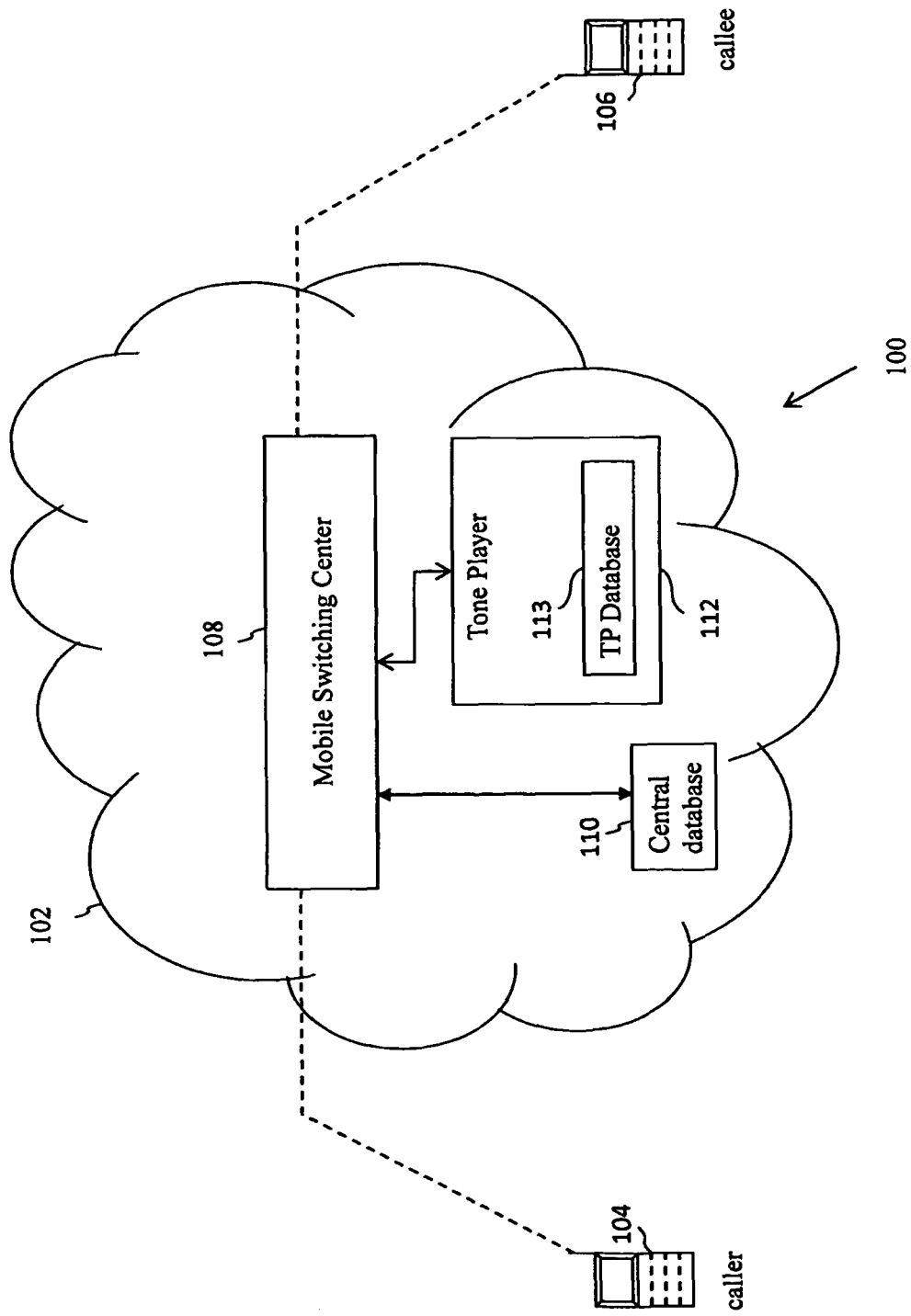
FIG. 1 is a schematic diagram illustrating a telecommunication system in accordance with an embodiment of the present invention.

FIG. 1 is a schematic diagram illustrating a telecommunication system 100 in accordance with an embodiment of the present invention. The telecommunication system 100 includes a telecommunication infrastructure 102 for establishing a connection between a caller 104 and a callee 106. The caller 104 and the callee 106 may use a telecommunication terminal such as a landline telephone, mobile phone, etc. to connect to the telecommunication system 100. The telecommunication infrastructure 102 further includes a mobile switching center (MSC) 108, a central database 110 and a tone player (TP) 112. The MSC 108 enables a call connection between the caller 104 and the callee 106. The central database 110 is used to store the subscription information for subscribers of a telecommunication service provider (TSP). An example of the central database 110 is a home location register (HLR). The subscription information of each subscriber may include without limitation, information regarding a unique identifier for the subscriber, name, location, mobile phone number, RBT IDs of one or more RBTs subscribed to by an RBT subscriber and the like. Each RBT is associated with an RBT ID. In an embodiment of the present invention, the RBT ID may refer to a unique identifier for an RBT.

In various embodiments of the present invention, the caller 104 initiates a call with the callee 106 by using a mobile phone. The MSC 108 receives the call request and establishes a connection with the callee 106. In an embodiment of the present invention, the MSC 108 checks with the central database 110 for RBT subscription of the callee 106. In case the callee 106 is subscribed to RBT, the call is forwarded to tone player (TP) 112 by using a switch at MSC 108. TP 112 then plays the RBT of the callee 106 to the caller 104. TP 112 includes a TP database 113 for storing RBT to be played to caller 104. The TP database 113 stores without limitation RBTs to be played, respective RBT IDs of the RBTs, phone numbers of the subscribers of the RBT service and the like.

In another embodiment of the present invention, the MSC 108 checks with the central database 110 for RBT subscription of the caller 104. In case the caller 104 is subscribed to RBT, the call is forwarded to tone player (TP) 112 by using a switch at MSC 108. TP 112 then plays the RBT set by caller 104 to caller 104 stored in TP database 113.

Figure 2:
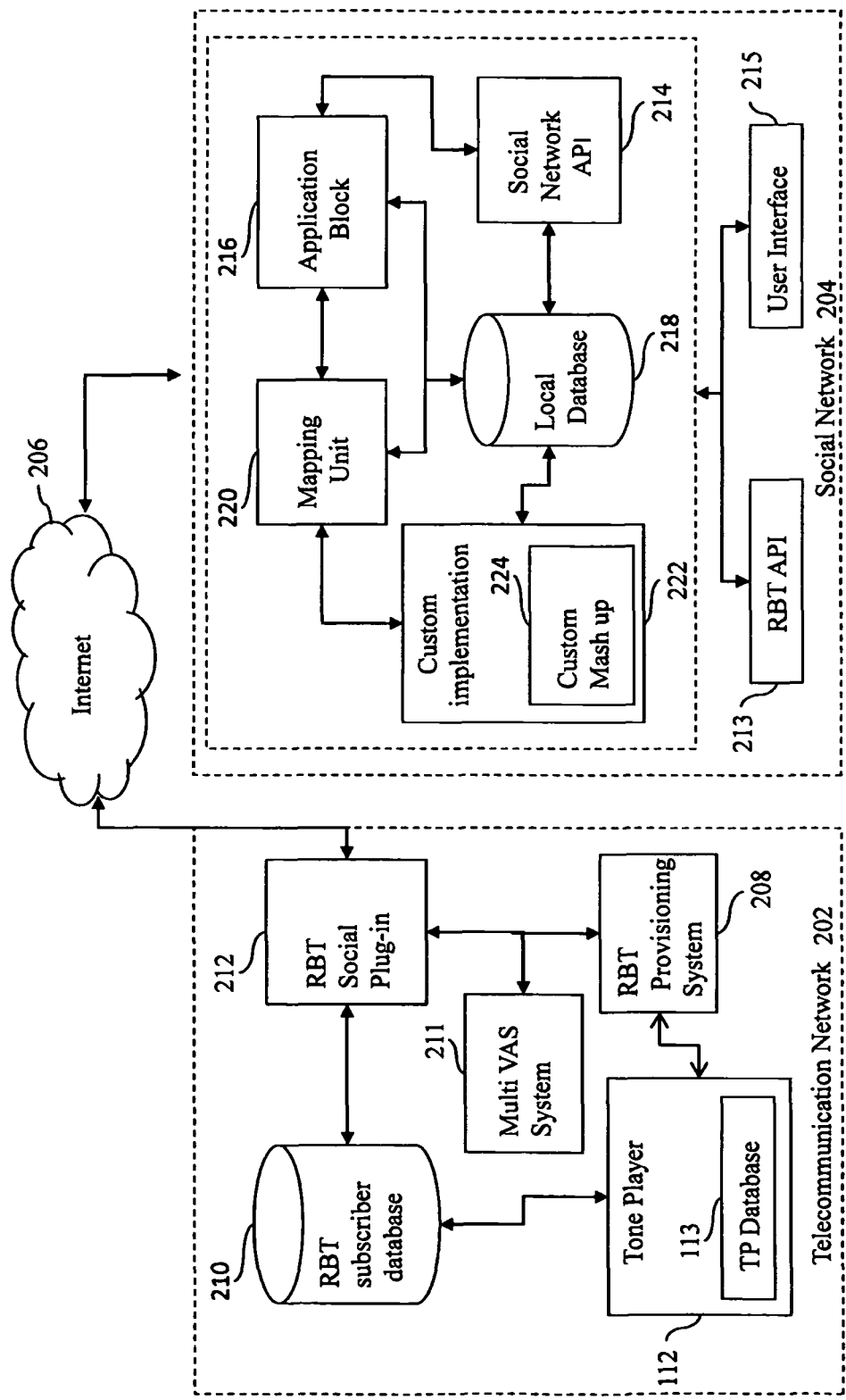
FIG. 2 is a schematic diagram illustrating a socio-RBT environment where the present invention may be implemented, in accordance with an embodiment of the present invention.

FIG. 2 is a schematic diagram illustrating a socio-RBT environment 200 where the present invention may be implemented, in accordance with an embodiment of the present invention. The socio-RBT environment 200 includes a telecommunication network 202 and a social network 204 communicating via Internet 206. The telecommunication network 202 includes an RBT provisioning system (RPS) 208, an RBT subscriber database (RSD) 210, a multi VAS system 211, an RBT social plug-in 212 and a tone player (TP) 112. Social network 204 includes an RBT API 213, a social network API (SN API) 214, a user interface (UI) 215, an application block 216, a local database 218, a mapping unit (MU) 220, a custom implementation (CI) 222 and a custom mash up (CMU) 224.

A user of a social networking site has a social network profile on the social networking site. The social network profile comprises of user information. The user information may include without limitation, information regarding name, gender, location, education profile, hobbies, interests in fields like sports, literature and contact details of the user. The user can send messages and share pictures and media with other users from the social network profile. In an embodiment of the present invention, a user has a social network profile on a social networking site and is also an RBT subscriber. When the user requests for subscription to socio-RBT service, UI 215 receives the request for subscription to the socio-RBT service application from the user. Socio-RBT service may include plurality of socio-RBT service applications. In an exemplary embodiment of the present invention, a socio-RBT service application enables the user to access social network profile information on RBT. Social network profile information may include social network profile updates of the subscribed users, multimedia content on the social network profile of the subscribed users and the like. UI 215 is an application on the social networking site that enables the user to subscribe to the socio-RBT service. The UI 215 allows the user to input his subscription information. The subscription information may include preferences input by the user while subscribing to the socio-RBT service application. In an exemplary embodiment, a user may have a social network profile on Orkut. The user may choose socio-RBT service application from the plurality of applications available on Orkut. The user may then subscribe to the socio-RBT service application by inputting the subscription information in UI 215 provided on Orkut. The preferences may include information regarding access permission to user's social network profile the user wishes to give to Orkut users, applications of the socio-RBT service the user wants to subscribe and the like. Moreover, UI 215 transmits the socio-RBT service information such as the subscription information of the RBT subscribers, social network profile information and the like of the user to SN API 214.

In an embodiment of the present invention, the SN API 214 is a set of standard APIs for running a plurality of web-based social network applications. SN API 214 may be based on computer programming languages such as HTML, Javascript, etc. The web-based social network applications implementing SN API 214 are interoperable with the social networking sites that support SN API 214. However, some social networking sites do not support SN API 214.

In an embodiment of the present invention, CI 222 is used to run applications on social networking sites that do not support SN API 214. CI 222 includes CMU 224. CMU 224 manages a plurality of applications on social network profile such as fan requests, poking requests and the like that are not supported by SN API 214. In an embodiment, in case a social networking site does not support SN API 214, CI 222 will receive the socio-RBT service information of the user from UI 215. Thereafter, CI 222 transmits the socio-RBT service information of the user to RSD 210 via RBT API 213, internet 206 and RBT social plug-in 212 respectively for storing. RBT API 213 is a set of standard APIs for establishing communication between the plurality of elements of social network 204 and RBT social plug-in 212. In an embodiment of the present invention, RBT API 213 enables to and fro channelization of socio-RBT service information between RBT social plug-in 212 and plurality of elements of social network 204 via internet 206.

Internet 206 enables communication between social network 204 and telecommunication network 202 through RBT social plug-in 212. RBT social plug-in 212 is connected to Internet 206 by an internet protocol (IP) based interface. An example of such an IP based interface is Hyper Text Transfer Protocol (HTTP). RBT social plug-in 212 is a front end for RSD 210. RBT social plug-in 212 has access to the socio-RBT service information stored in RSD 210. The access to the socio-RBT service information stored in RSD 210 is limited because of the security policies of the TSP. RBT social plug-in 212 is a gateway that enables to and fro channelization of the socio-RBT service information between telecommunication network 202 and social network 204. In an embodiment of the present invention, the to and fro channelization of the socio-RBT service information is initiated by RBT social plug-in 212 in accordance with the security policies. Moreover, RBT social plug-in 212 retrieves social network profile information from SN API 214 for social networking sites that support SN API 214. RBT social plug-in 212 has a layer of RBT internet API, wherein the RBT internet API is a set of application programming interfaces (APIs) for interfacing with social network 204. RBT internet API is responsible for retrieving social network profile information from social network 204, transmitting subscription information to the social network 204 and the like. Further, RBT social plug-in 212 generates an RBT media file based on the socio-RBT service applications subscribed by a user and pushes the RBT media file to TP database 113. In an exemplary embodiment of the present invention, suppose user A is subscribed to socio-RBT service application for getting updates. of his social network profile. In case user A receives a message from user B, in social network profile of user A, RBT social plug-in 212 generates an RBT media file notifying user A regarding the message sent by user B to user A. The RBT media file can be generated by converting the retrieved social network profile information to a media file. The RBT media file is then stored in TP database 113. Further, when user A calls user B, the RBT media file stored in TP database 113 is played to user A by TP 112.

In an embodiment of the present invention, RPS 208 is a set of APIs wherein the APIs may perform various functions such as charging, provisioning RSD 210, network based provisioning and the like. Further, RPS 208 handles registration of the user to the RBT service. Thereafter, the subscription information of the user registered as the RBT subscriber is uploaded in central database 110 by RPS 208. In an embodiment, RPS 208 receives the request for subscription to the socio-RBT service application from the user. Further, the subscription information of the user subscribed to the socio-RBT service is uploaded in RSD 210 by RPS 208.

In an embodiment of the present invention, value added services (VAS) provider provides the RBT service to an RBT subscriber in collaboration with the TSP. In an example, the VAS provider providing the socio-RBT service is different from the VAS provider providing the RBT service to a user. In such a scenario, multi VAS system 211 is used by VAS provider providing the socio-RBT service. Multi VAS system 211 is a database comprising of information including, but not limited to, name, location, RBT ID of the RBT subscribed to by the user. Multi VAS system 211 opens a plurality of APIs to enable RBT social plug-in 212 to retrieve the socio-RBT service information. Further, multi VAS system 211 pushes social network profile information of the user to the RBT social plug-in 212 to generate an RBT media file regarding the social network profile of the user.

In an embodiment of the present invention, the social network profile of the user is associated with a profile ID. The profile ID is a unique identifier of the social network profile on the social networking site. MU 220 maps the profile ID of the user to his corresponding phone number and the user's phone number to his corresponding profile ID. Application block 216 extracts profile ID of a subscribed user from SN API 214. In an embodiment of the present invention, application block 216 may extract profile ID of the user at regular intervals of time. For example, application block 216 may extract profile ID in every 1 hour or 6 hours or twice a day or once a day. In another embodiment of the present invention, application block 216 may extract profile ID of the user in a real-time scenario. The extracted profile ID is then associated with mobile phone number of the user. In an embodiment of the present invention, application block 216 may retrieve the mobile phone number of the user corresponding to user's social network profile on the social networking site from MU 220. In another embodiment of the invention, application block 216 may retrieve the phone number of the user corresponding to user's social network profile on the social networking site directly from SN API 214. The retrieved phone number is then transmitted to RSD 210 along with the corresponding social network profile information via RBT API 213, internet 206 and RBT social plug-in 212 respectively.

In an embodiment of the present invention, RBT social plug-in 212 retrieves social network profile information from SN API 214 and stores the retrieved social network profile information in RSD. 210. For example RSD 210 may be updated at predetermined intervals such as 1 hour or 6 hours or twice a day or once a day.

In various embodiments of the present invention, Local Database 218 in the social network 204 stores a local copy of the socio-RBT service information stored in RSD 210. Local database 218 extracts subscription information of RBT subscribers from RSD 210 via RBT social plug-in 212, Internet 206 and RBT API 213 respectively, and profile ID and the corresponding social network profile information from SN API 214 periodically. In an embodiment of the present invention, the subscription information, profile ID and the corresponding social network profile information is extracted in a real-time scenario. In another embodiment of the present invention, the subscription information, profile ID and the corresponding social network profile information is extracted at regular intervals of time. For example, the local database 218 may be updated in every 1 hour or 6 hours or twice a day or once a day.

Figure 3:
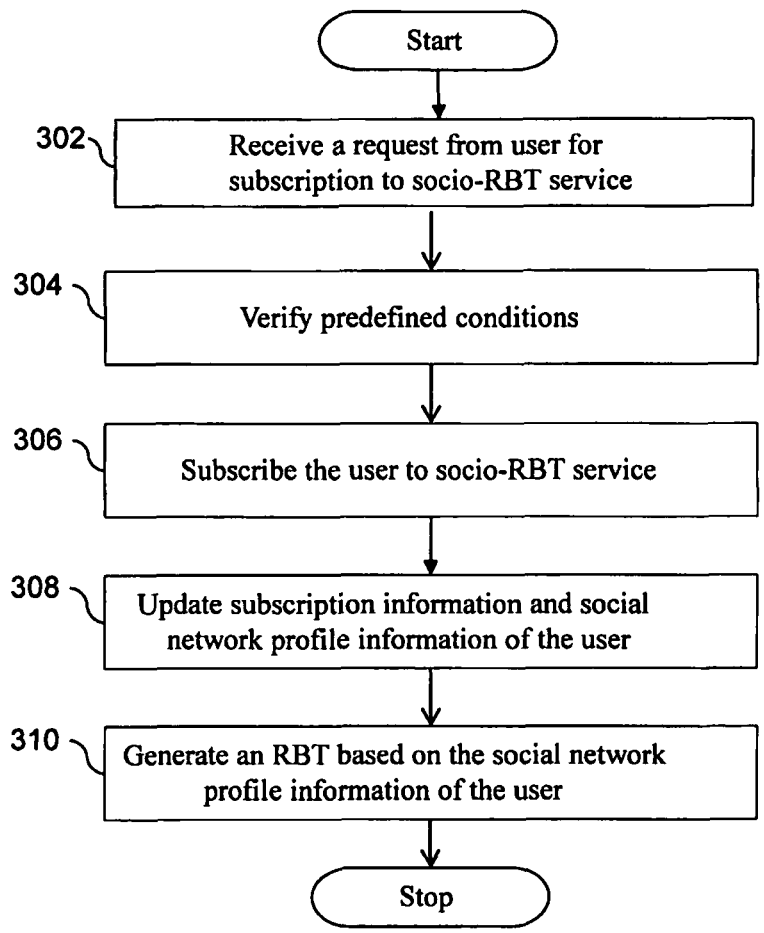
FIG. 3 is a flowchart illustrating a method for registering a user to a socio-RBT service application.

FIG. 3 is a flowchart illustrating a method for registering a user to a socio-RBT service application. In an embodiment of the present invention, a user makes a request for subscribing to the socio-RBT service application.

In an embodiment of the present invention, at step 302, a user interface in the social network receives a request for subscription to the socio-RBT service application from a user subscribed to socio-RBT service application. The user is a subscriber to a social networking site as well as a mobile phone subscriber. In an example, UI 215 (FIG. 2) receives the request. The request for subscription to the socio-RBT service application involves input on various user attributes by the user that comprise of the user's subscription information. The user attributes provided by the user may include information related to mobile service subscription of the user. By way of example, but without limitation, the information includes name, location, email identifier and mobile phone number of the user. Further, request for subscription to the socio-RBT service application comprises providing information regarding preferences for executing one or more social networking applications, preferences for accessing social network profiles and preferences for updating social network profiles. The user may request for registration to the socio-RBT service, using a plurality of interfaces including, but not limited to, Wireless Access Protocol (WAP), Internet, Short Message Service (SMS), Unstructured Supplementary Service Data (USSD), and Interactive Voice Response (IVR) and the like.

In another embodiment of the present invention, at step 302, an RBT provisioning system in the telecommunication network receives a request for subscription to the socio-RBT service application from a user of a mobile phone who is also a subscriber to a social networking site. RPS 208 in the telecommunication network 202 receives a request from a user regarding subscription to the socio-RBT service application. The request may be received using a plurality of interfaces including, but not limited to, Wireless Access Protocol (WAP), Internet, Short Message Service (SMS), Unstructured Supplementary Service Data (USSD), and Interactive Voice Response (IVR) and the like. The request for subscription to the socio-RBT service application involves input on various user attributes by the user that comprise of the user's social network subscription information. The user attributes may include but are not limited to, location such as country or state where the user is located, social networking site to which the user is registered to, user identifier or profile identifier for accessing the social networking site that the user is subscribed to, socio-RBT service application to which the user wants to subscribe and the likes.

At step 304, in an embodiment of the present invention, the user interface in the social network verifies one or more predefined conditions for subscription of the user to the socio-RBT service. In an embodiment of the present invention, the predefined conditions may include, but are not limited to RBT service subscription of the user, verification of eligibility of the user for subscription to the socio-RBT service application; authenticity of the user, and the like. UI 215 verifies the RBT service subscription of the user from RSD 210 via RBT API 213, Internet 206, RBT social plug-in 212 and RPS 208 respectively. Based on the mobile phone number of the user, RPS 208 checks with RSD 210 whether the user is an RBT subscriber or not. This information is then communicated to the UI 215 through the RBT social plug-in 212. In case the user is not an RBT subscriber RPS 208 subscribes the user to the RBT service. The subscription information is then updated by RPS 208 in the RSD 210 and is communicated to the UP 215 through the RBT social plug-in 212.

Verification of eligibility of the user for subscription to the socio-RBT service application involves, determination of TSP the user is registered to by the user interface and determination of collaboration between TSP the user is registered to and VAS provider of a socio-RBT service. The user interface determines the TSP the user is registered to, based on the user attribute values input by the user such as name, location and mobile phone number of the user. In an embodiment of the present invention, in case the user interface determines that the TSP that the user is registered to has collaboration with VAS provider of the socio-RBT service, then the user is eligible for subscription to the socio-RBT service application. In another embodiment of the present invention, in case the user interface determines that the TSP that the user is registered to has no collaboration with VAS provider of the socio-RBT service, then it is verified whether multi-VAS system in the telecommunication network has socio-RBT service information of the user. In this case, the user is eligible for subscription to the socio-RBT service application only if the multi-VAS system has socio-RBT service information of the user. In another embodiment of the present invention, in case the user interface determines that the TSP that the user is registered to has no collaboration with the VAS provider of the socio-RBT service, and multi-VAS system does not have socio-RBT service information of the user, then the user is not eligible for subscription to the socio-RBT service application.

Verification of authenticity of the user is achieved by sending an authentication message by an RBT provisioning system (RPS) in the telecommunication network to the user requesting for subscription to socio-RBT service. The authentication message may be sent using a plurality of interfaces including, but not limited to, wireless access protocol (WAP), Internet, Short Message Service (SMS), unstructured supplementary service data (USSD), and interactive voice response (IVR) and the likes. The authentication message includes details of the socio-RBT service application requested by the user and a request to reply to the authentication message. Further, the authentication message is sent to mobile phone of the user or to social network profile of the user, depending on whether the user requests for subscription through his mobile phone or through social networking website. In an example, user may receive an SMS on the mobile phone number provided by the user. The SMS may inform the user about the socio-RBT service application to which the user has requested to subscribe and the user is requested to reply to the SMS to confirm the request for subscription. The SMS sent to the user may include a password that the user is required to enter on his social network profile for subscription to the socio-RBT service application. In another example, the RPS sends an authentication message to social network profile of the user in a social network with a request to reply to the authentication message. For example, in case the user requests for subscription to socio-RBT service by calling a voice portal, the user may be required to input the password received in the social network profile of the user as the authentication message. The user may authenticate himself via user interface in the social network or by sending the password received, via SMS to the RPS.

After verification of the one or more predefined conditions, at step 306, user interface subscribes the user to the socio-RBT service application and installs the socio-RBT service application on the user's social network profile. For subscribing the user to the requested socio-RBT service application, the RBT provisioning system transmits received user attributes such as mobile phone number of the user to the user interface. In an embodiment of the present invention, in the socio-RBT environment of FIG. 2, RPS 208 transmits user attributes to the user interface 215 via RBT social plug-in 212, internet 206 and RBT API 213 respectively.

Further, the user may be notified regarding subscription to the socio-RBT service application. Thereafter, the user interface transmits the socio-RBT service information to social network API. In an embodiment of the present invention, in the socio-RBT environment of FIG. 2, the UI 215 transmits the socio-RBT service information to the SN API 215. SN API 214 then transmits the socio-RBT service information of the user to RSD 210 for storing, via RBT API 213, internet 206 and RBT social plug-in 212 respectively. However, in case the user is not eligible for being subscribed to socio-RBT service, the user is not registered to the socio-RBT service application and the user is notified that the socio-RBT service application cannot be provided to the user.

At step 308, an application block in the social network extracts profile identifier of the subscribed user from the social network API. Application block also retrieves phone number corresponding to the profile identifier of the user. The extracted social network profile information corresponding to the retrieved phone number and profile identifier is then transmitted to RBT subscriber database. In an embodiment of the present invention, in the socio-RBT environment of FIG. 2, the extracted social network profile information is transmitted to the RSD 210 via RBT API 213, internet 206 and RBT social plug-in 212 respectively. In another embodiment, the application block updates subscription information and social network profile information corresponding to the retrieved phone number and profile identifier in a local database in the social network.

Thereafter, at step 310, an RBT social plug-in generates an RBT media file based on the socio-RBT service applications subscribed by the user and pushes the RBT media file to TP database in the telecommunication network. Examples of RBT media files generated include files corresponding to video files and audio files stored in social network profiles. In embodiments where a caller making a call to a callee is prompted to provide input for applying various applications of socio-RBT service via an RBT, examples of RBT media files generated include media files requesting caller to provide input for applying a poking application, granting caller an option of becoming a callee's fan on the social network profile of callee, granting the caller an option of copying social network profile content of callee into the social network profile of the caller, giving caller an option for connecting to the callee on at least one social networking site and the like. In an embodiment of the present invention, in the socio-RBT environment of FIG. 2, RBT social plug-in 212 retrieves social network profile information of the user from RSD 210 based on the socio-RBT service applications to which the user is subscribed, for generating an RBT media file. In an example, the RBT social plug-in 212 retrieves social network profile information of the user at regular intervals of time. In another example, the RBT social plug-in 212 retrieves social network profile information of the user in real-time. In yet another example, the RBT social plug-in 212 retrieves social network profile information of the user periodically. In an embodiment of the present invention, the social network profile information of the user regarding various changes made by the user on his profile, such as, a video uploaded by the user, an album uploaded by the user on the social network profile of the user and the like is retrieved by RBT social plug-in 212.

In an embodiment of the present invention, a caller may subscribe to socio-RBT service application for monitoring, activities of callee. The RBT social plug-in in such a case retrieves from RSD, the social network profile information of the callee regarding the communities or friend groups joined by the callee on the social network profile of callee, relationship status of the callee on the social network profile of callee and the like. For example, the monitoring may be by parents of the callee.

In another embodiment of the present invention, a caller may subscribe to socio-RBT service application for getting social network profile content of the callee. Examples of social network profile content may include, without limitation, multimedia content such as video uploaded by the callee or album uploaded by the callee in his social network profile, updates made by the callee such as twitter updates etc. In yet another embodiment, the caller may subscribe to socio-RBT service application for getting his own multimedia social network profile content. Multimedia social network profile content such as video uploaded by caller, album uploaded by caller and the like, is then retrieved by RBT social plug-in.

In yet another embodiment of the present invention, a caller may subscribe to socio-RBT service application for receiving RBT based on social network profile content of the caller himself. In the embodiment, a caller while calling a callee receives profile content or updates made to his own social networking website without logging on to the website. For example, in the socio-RBT environment of FIG. 2, if the caller 104 has set preferences for accessing a rock music file on his social network profile, then the rock music file will be retrieved from the social network by RBT social plug-in 212 and is delivered to the user.

In yet another embodiment of the present invention, the caller may subscribe to socio-RBT service application for getting RBT based on social network communities registered to by the caller and the callee. A social network community is a community of plurality of users of social networking site. In this case, RBT of the social network community is retrieved by RBT social plug-in from RBT subscriber database. In case, there are more than one social networking sites that the caller and the callee are registered to, then the caller can prioritize the social networking sites for playing RBT. In an exemplary embodiment of the present invention, administrator of the social networking site may subscribe members of the social network community to socio-RBT service application for RBT based on the social network community. RBT selected by the administrator of the social networking site is retrieved by RBT social plug-in from RSD.

In yet another embodiment of the present invention, moderator of a social network community may subscribe members of the social network community to socio-RBT service application for obtaining RBT based on the social network community. RBT selected by the moderator of the social networking community is retrieved by RBT social plug-in 212 from RSD 210.

In yet another embodiment of the present invention, the administrator of a social networking site can update the socio-RBT service applications included in the socio-RBT service. The user can update subscription to the socio-RBT service in case he wants to modify his subscription to the socio-RBT service. Modifying the socio-RBT service subscription may include without limitation, adding one or more socio-RBT service applications. The user may update subscription to the socio-RBT service using a plurality of interfaces including, but not limited to, wireless access protocol (WAP), internet, short message service (SMS), unstructured supplementary service data (USSD), and interactive voice response (IVR) and the like.

Figure 4:
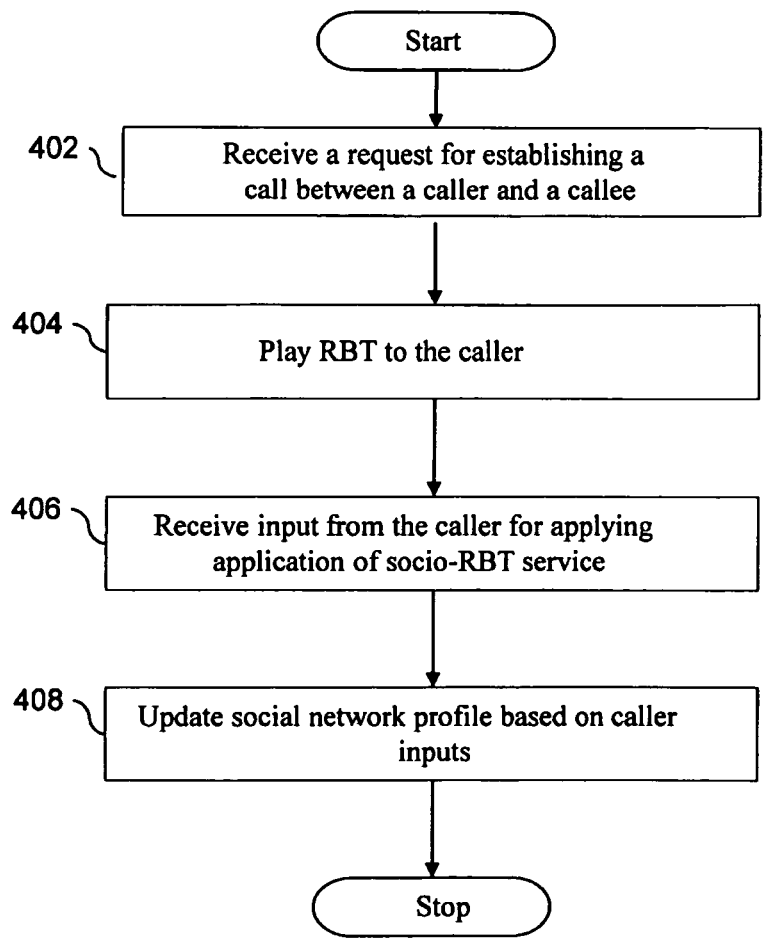
FIG. 4 is a flowchart illustrating a method for playing an RBT based on social network profile to a caller, in accordance with an embodiment of the present invention.

FIG. 4 is a flowchart illustrating a method for playing an RBT based on social network profile to a caller, in accordance with an embodiment of the present invention. In an embodiment of the present invention, at step 402, when a caller initiates a call with a callee by using the mobile phone, a Mobile Switching Center (MSC) in the telecommunication infrastructure receives the call request and establishes a connection with the callee. In an embodiment of the present invention, the MSC checks with a central database for RBT subscription of the caller. In case the caller is subscribed to RBT, the call is forwarded to a Tone Player (TP) by using a switch at the MSC. TP retrieves the RBT stored for caller in a TP database and plays the RBT to the caller at step 404. In another embodiment of the present invention, MSC checks with the central database for RBT subscription of the callee. In case the callee is subscribed to RBT, the call is forwarded to TP by using a switch at the MSC. TP retrieves the RBT stored for the callee in TP database and plays the RBT to the caller, at step 404.

At step 406, in an embodiment of the present invention, an RBT prompting a caller to provide input for applying various applications of socio-RBT service during ring back time is delivered to the caller. Ring back time is the time during which RBT is played to the caller.

In an embodiment of the present invention, a caller may be given an option of becoming a callee's fan based on call history. Call history may include, without limitation number of times the caller has made a call to the callee in a predefined period of time. In another embodiment of the present invention, a caller is given an option of connecting to callee on more than one social networking sites. For example, suppose a caller and a callee are connected through a social networking site A. In this case, an RBT may be played to caller giving the caller an option of connecting to a callee on another social networking site B. Additionally, the callee's phone number may be provided on the social network profile of callee so that the caller may call on the provided phone number and connect to the callee on the other social networking site.

In various embodiments, RBT prompting a caller to provide input may include a media file requesting caller to provide input for applying a poking application, granting caller an option of becoming a callee's fan on the social network profile of callee, granting the caller an option of copying social network profile content of callee into the social network profile of the caller, giving caller an option for connecting to the callee on at least one social networking site and the like.

In an embodiment of the present invention, the input sent by the caller is received by the RBT Provisioning System (RPS) in the telecommunication network. In an example, the caller may send input by pressing at least one Dual-Tone Multi-Frequency (DTMF) key on the mobile phone of the caller, sending voice command and the like while listening to RBT. The inputs sent by the caller are received by the RPS in the telecommunication network.

In an embodiment of the present invention, the caller may provide input for applying a poking application to social network profile of the callee. For example, the caller can virtually greet the callee on the social network profile of the callee by using greeting application and the like.

In another embodiment of the present invention, the caller may provide input for receiving USSD, SMS, MMS and the like based on the retrieved social network profile information, from RBT provisioning system. For example the caller may receive social network profile information by pressing at least one dual-tone multi-frequency (DTMF) keys on the mobile phone of caller while listening to the RBT. The caller may also receive social network profile information by sending voice command while listening to an RBT.

At step 408, the RPS may update local database in the social network based on inputs received from the caller and the subscribed application. In an embodiment of the present invention, in the socio-RBT environment of FIG. 2, the local database in the social network 204 is updated by the RPS 208 via RBT social plug-in 212, internet 206 and RBT API 213 respectively. The SN API 214 pushes the updated information from local database 218, to the social networking site. Thereafter, administrator of the social networking site publishes the updated information on the web page of the respective social network profile of the caller based on the preferences selected by the subscriber of the socio-RBT service.

In another embodiment of the present invention, in the socio-RBT environment of FIG. 2, RPS 208 may directly update SN API 214 through RBT social plug-in 212 and internet 206 respectively based on the inputs received from the caller and the subscribed application. Further, SN API 214 pushes the updated information to the social networking site. Thereafter, the administrator of the social networking site publishes the updated information on the web page of the respective social network profile of the caller based on the preferences selected by the subscriber of the socio-RBT service.

In yet another embodiment of the present invention, in the socio-RBT environment of FIG. 2, RPS 208 may update CMU 224 through RBT social plug-in 212 and internet 206 respectively based on the inputs received from the caller 104 and the subscribed application, wherein the subscribed applications are not supported by SN API 214. Examples of scenarios where RPS 208 may update Custom Mashup (CMU) 224 may include fan requests, poking requests application and the like. Further, CMU 224 pushes the updated information from local database 218, to the social networking site. Thereafter, the administrator of the social networking site publishes the updated information on the web page of the respective social network profile of the caller based on the preferences selected by the subscriber of the socio-RBT service.

In an embodiment of the present invention, poking information provided to the social networking site is used to update social network profile of the caller, the callee and other users based on the response of caller and preferences selected by the subscriber of the socio-RBT service. Examples of updates include without limitation notification that the caller has poked the callee, fan list of the callee on the social networking site of the callee, and that the caller is connected to the callee on the requested social networking site.

In another embodiment of the present invention, the caller subscribes to an application that allows the caller to copy social network profile content of the callee into her own social network profile. Thereafter, the updated information is published on the web page of social network profile of the caller. For example if the caller has requested to copy a photograph from the social network profile of the callee, the requested photograph would be copied to the album of caller.

While the exemplary embodiments of the present invention are described and illustrated herein, it will be appreciated that they ate merely illustrative. It will be understood by those skilled in the art that various modifications in form and detail may be made therein without departing from or offending the spirit and scope of the invention as defined by the appended claims.

What is claimed is:

1. A system for provisioning services available in an online social network to a user in a telecommunication network through ring back tones, the system comprising:
   a user interface configured to receive a subscription request for socio-ring back tone (RBT) service applications from a user in the online social network, wherein the socio-RBT service applications enable a user to access social network profile information of one or more socio-RBT service application subscribers,
  wherein the subscription request selects one or more socio-RBT service applications from among a plurality of available socio-RBT service applications,
  and wherein each of the plurality of available socio-RBT service applications defines a distinct information subset retrievable from the online social network for inclusion in a RBT transmitted to the user;
a social network API comprising one or more APIs configured to receive socio-RBT service information from the user interface and to transmit the socio-RBT service information to a plug-in module in the telecommunication network, wherein the socio-RBT service information comprises socio-RBT service application subscription information corresponding to the user;
an RBT social plug-in configured to:
  (i) exchange socio-RBT service information between one or more elements of the online social network and one or more elements of the telecommunication network,
  (ii) store the socio-RBT service information in a subscriber database,
  (iii) generate for playback to the user, one or more RBT media files comprising information retrieved from the online social network, wherein contents of the generated RBT media files are determined by the one or more socio-RBT service applications selected by the user in the subscription request, and
  (iv) store the generated one or more RBT media files in a tone player database for storing RBT media files;
an RBT subscriber database configured to store the socio-RBT service subscription information; and
a tone player configured to play RBT based on the one or more RBT media files stored in the tone player database.

2. The system of claim 1, wherein the subscription requests received by the user interface comprises information regarding at least one of the user's preferences for executing one or more social networking applications, the user's preferences for accessing social network profiles and the user's preferences for updating social network profiles.

3. The system of claim 1, wherein the social network API is further configured to execute one or more social networking applications on social networking websites based on inputs provided by the user, wherein the inputs are related to updating social network profiles.

4. The system of claim 1 further comprising a custom implementation unit including a custom mashup module for executing one or more socio-RBT applications on social networking websites based on inputs provided by the user.

5. The system of claim 1 further comprising an RBT provisioning system configured to receive subscription requests from the user, and configured to verify authenticity of the user when the user requests subscription to the socio-RBT service.

6. The system of claim 5 further comprising:
an application block configured to transmit a profile identifier, a mobile phone number associated with the profile identifier, and social network profile information of the user to the RBT subscriber database through the RBT social plug-in, wherein prior to transmitting the application block extracts the profile identifier and the social network profile information from the social network API, and the mobile phone number from a mapping unit;
a mapping unit configured to map profile identifier of a social network profile to corresponding mobile phone number of a user and vice versa;
an RBT API comprising a set of APIs configured to facilitate transmission of data between one or more elements of the social network and the RBT social plug-in, wherein the data comprises socio-RBT service information, profile identifier, mobile phone number, and social network profile information of a subscribed user; and
a multi-VAS system configured to store RBT information such as name, location, RBT ID of RBT subscribed by the user and further configured to open a plurality of APIs to enable RBT social plug-in to retrieve socio-RBT service information.

7. A method for subscribing a user to a socio-RBT service, the socio-RBT service being used for provisioning online social network services to a user in a telecommunication network through ring back tones, the method, implementing using at least one processor, comprising the steps of:
receiving a request from the user for subscription to a socio-ring back tone (RBT) service,
  wherein the request for subscription selects one or more socio-RBT service applications from among a plurality of available socio-RBT service applications,
  and wherein each of the plurality of available socio-RBT service applications defines a distinct information subset retrievable from the online social network for inclusion in a RBT transmitted to the user;
generating for playback to the user, one or more RBT media files comprising information retrieved from the online social network, wherein contents of the generated RBT media files are determined by the one or more socio-RBT service applications selected by the user in the subscription request;
transmitting to the user, a RBT based on the generated one or more RBT media files for playback when the user places a call to a callee.

8. The method of claim 7, wherein the request for subscription to the socio-RBT service comprises providing input on one or more user attributes related to mobile service subscription of the user, such as, name, location, email identifier and mobile phone number of the user.

9. The method of claim 7, wherein the request for subscription to the socio-RBT service comprises providing input on one or more user attributes related to online social network subscription information of the user, such as, social networking site registered to by the user and user identifier or profile identifier for accessing a social networking site.

10. The method of claim 7 further comprising installing an application corresponding to the socio-RBT service on the user's social network profile after subscribing the user to the socio-RBT service application.

11. The method of claim 7, further comprising:
verifying one or more predefined conditions for subscription;
registering the user to the socio-RBT service; and
updating subscription information and social network profile information of the user;
wherein the one or more predefined conditions comprises at least one of RBT service subscription of the user, verification of eligibility of the user for subscription to the socio-RBT service application and authenticity of the user, wherein verification of eligibility of the user for subscription comprises determination of TSP the user is registered to by the user interface and determination of collaboration between TSP the user is registered to and VAS provider of a socio-RBT service.

12. A method for provisioning online social network services to a caller in a telecommunication network subscribed to a socio-RBT service, wherein the social network services are provisioned to the caller using ring back tones, the method comprising implementing using at least one processor, the steps of:

receiving a request for establishing a call between a caller and a callee;

checking, using the at least one processor, a central database for RBT subscription of at least one of the caller and the callee;

retrieving, using the at least one processor, a ring back tone corresponding to social network profile of at least one of the caller and the callee from a tone player database, wherein the ring back tone is retrieved based on socio-RBT service subscription of the caller or the callee; and playing the ring back tone to the caller, wherein playing the ring back tone to the caller comprises prompting the caller during ring back time to provide input for executing one or more applications of the socio-RBT service.

13. The method of claim 12, wherein the RBT played to the caller corresponds to social network profile information of the callee.

14. The method of claim 12, wherein the RBT played to the caller corresponds to social network profile information of the caller.

15. The method of claim 12 further comprising:

receiving input from the caller for executing the one or more applications of socio-RBT service; and updating a social network profile based on caller inputs.

16. The method of claim 15, wherein input received from the user comprises input for applying a poking application.

17. The method of claim 15, wherein input received from the user comprises input for granting the caller an option of becoming a callee's fan on the social network profile of callee.

18. The method of claim 15, wherein input received from the user comprises input for granting the caller an option of copying social network profile content of the callee into the social network profile of the caller.

19. The method of claim 15, wherein input received from the caller comprises an option for connecting to the callee on one or more online social networking sites.

\* \* \* \* \*